Patented Mar. 6, 1934

1,949,479

UNITED STATES PATENT OFFICE 1,949,479

VITREOUS ENAMELS AND PROCESS OF MAKING SAME

Charles J. Kinzie and Charles H. Commons, Jr., Niagara Falls, N. Y., assignors to The Titanium Manufacturing Company, New York, N. Y., a corporation of Maine No Drawing. Application March 8, 1930, Serial No. 434,447

2 Claims. (Cl. 106—36.2)

Our invention relates more particularly to improved methods for the production of acid resisting enamels or glazes, especially fruit and vegetable acids such as citric, acetic, malic etc.

The objects of our invention are, among other things, to produce such acid resisting vitreous enamels that will have a good enamel surface on the article coated as to lustre and finish as well as of low melting point, good slip working properties and also lack of tendencies for crystallization with development of undesirable colors. In the production of acid resisting enamels and glazes, the glass for vitreous enameling should be low in, or entirely free from, alumina, and the silica should be restricted to amounts at or below 50% in the glass.

It has heretofore been proposed to use titanium compounds for imparting the property of acid resistance to enamels and glazes, but according to our extensive experiments in the use of titanium compounds, such as titanium oxide, the results are not satisfactory and fail to produce desirable white enamels even by lowering the usual silica content, mainly because the resultant enamels are not completely resistant to fruit acids. Furthermore we have also discovered that the effect of aluminum in the enamel is detrimental to acid resistance in that it is easier to produce an acid resistant enamel containing no aluminum than one having an aluminum content.

We have now discovered that in order to produce enamels or glazes completely resistant to fruit acids and at the same time not to be materially different in working properties, color and lustre from commonly used enamels, that alumina should be dispensed with as an enamel constituent for acid resisting enamels for sheet metal enameling, yet some method must be used for imparting the required properties to the enamel where such aluminum bearing materials were omitted from the raw batch.

According to our invention we have discovered that by introducing zirconium compounds into the raw batch of enameling materials substantially free from alumina sufficient titanium compounds can also be added to impart complete resistance to fruit acids while producing enamels of the desired low melting point together with absence of crystallization tendencies that accompany a high titanium content in alumina bearing enamels. In our improved acid resistant enamels that are practically free from alumina, the silica content should not exceed 50%, and is preferably below 50%; the titanium content should range from 6% to 18% and the zirconium content should range from 2% to 10%.

In order that the nature of our discoveries may be understood, the following example is given to show specifically the composition of our acid resistant enamel, and the method of compounding same with both titanium and zirconium compounds combined in the raw batch, such example being merely illustrative of how our improved methods may be successfully practiced and in no wise limiting the scope of our invention.

Example

The raw materials when weighed and then mixed compose what is commonly referred to as the raw milk or smelter batch as follows:—

| | Parts by weight |
|---|---|
| Sodium zirconium silicate | 7.08 |
| Quartz—140 mesh | 40.58 |
| Borax | 18.94 |
| Soda ash ($Na_2CO_3$) | 19.65 |
| Sodium nitrate | 3.50 |
| Titanium oxide | 13.86 |
| Red lead ($Pb_3O_4$) | 3.04 |
| Antimony oxide | 6.93 |
| Fluorspar ($CaF_2$) | 5.94 |
| | 119.52 |

It is to be understood that we do not confine ourselves to exact amounts or kind of these ingredients. For instance, we have sometimes dispensed with the small amount of lead present, at same time increasing the $B_2O_3$ in amount equivalent in weight to PbO removed.

The sodium zirconium silicate preferably used in this raw mix has approximately the following composition, and may contain some zirconium silicate.

| | Percent |
|---|---|
| Zirconium oxide ($ZrO_2$) | 55.95 |
| Silica ($SiO_2$) | 28.40 |
| Sodium oxide ($Na_2O$) | 13.90 |
| Alumina + $P_2O_5$ and traces of rare earths ($Al_2O_3+$) | 1.48 |
| Titanium oxide ($TiO_2$) | 0.10 |
| Iron oxide ($Fe_2O_3$) | 0.09 |
| Moisture | 0.08 |
| | 100.00 |

The titanium oxide introduced in this raw batch should be a high grade $TiO_2$, preferably over 98% $TiO_2$, and containing less than 0.05% $Fe_2O_3$.

When the raw materials have been weighed they should be charged to a mixer and blended. The mixing machinery and operation should be such as will rub down and thoroughly blend by disintegration so that in the mix as charged to the smelter the titanium oxide is intimately in contact with the other ingredients of the batch and not existing as separate large aggregates.

The mixture is charged to a smelting furnace suitable for smelting enamels, and by heating at temperature of about 1,850° F. to 2,050° F., a melt is produced. When examination of samples shows that the various raw materials have combined to the production of a uniform white glass, the charge is withdrawn and by running the molten glass into water the usual enamel frit is produced.

The batch given when smelted to production of this enamel frit would yield approximately the following composition:

|  | Percent |
|---|---|
| Sodium oxide ($Na_2O$) | 16.48 |
| Lead oxide (PbO) | 2.97 |
| Calcium fluoride ($CaF_2$) | 5.94 |
| Boric anhydride ($B_2O_3$) | 6.93 |
| Titanium oxide ($TiO_2$) | 13.86 |
| Silica ($SiO_2$) | 42.57 |
| Zirconia ($ZrO_2$) | 3.96 |
| Antimony oxide ($Sb_2O_5$) | 6.93 |
|  | 100.00 |

The enamel glass or frit produced as described may now be prepared for the wet process enameling operation in following manner:

| Mill charge | Parts by weight |
|---|---|
| Frit | 100 |
| English pipe clay | 4 |
| Zirconium oxide | 8 |
| Ammonium carbonate | 0.25 |
| Water | 31 |
|  | 143.25 |

In the mill mix we have used other clays and find that 3% Illinois kaolin is as effective as the 4% English pipe clay, and also gives a somewhat purer white color to the enamel.

This charge is introduced into a pebble or ball mill, and is milled to a fineness suitable for enameling, usually to such a degree of fineness that about 6 grams oversize remain on 200 mesh screen from a 100 c. c. sample.

The milled enamel is discharged from the mill and adjusted to suitable consistency which will vary depending upon how such white enamel is to be applied to the sheet metal article.

The article to be coated has been previously enameled with the usual ground coat and is then given a coating of the white enamel as hereinbefore described and prepared. The piece is dried and then fired at a suitable temperature, say at 1,550° F. A second coat of white enamel is then applied, dried and burned on.

The resulting enameled article will be found to withstand successfully the acid of citrus fruit, and will be found quite impervious to the action of all of the common acids met with in cooking and household operations.

We do not confine the invention to enamels for sheet iron enameling as excellent results have been produced on cast iron by the wet process as well as on cast iron by the dry process.

The enamel is useful particularly as an enamel for sinks, table tops, drain boards, etc., or in fact wherever it is important to have iron articles coated with a vitreous acid resisting enamel.

According to our invention both the titanium and zirconium compounds are initially contained and compounded in the raw batch of enameling materials, preferably substantially free from alumina, and are then smelted to form the enamel frit which may or may not be thereafter mixed with suitable opaquing materials at the mill.

We claim as our invention:—

1. The process for producing an opaque frit for vitreous enamels resistant to acids which comprises mixing a raw batch of enameling materials substantially in the following proportions in parts by weight: sodium zirconium silicate 7.08; quartz 40.58; borax 18.94; soda ash 19.65; sodium nitrate 3.50; titanium oxide 13.86; red lead 3.04; antimony oxide 6.93; and flluorspar 5.94, and then heating the raw batch so mixed to fusion and formation of said opaque enamel frit.

2. An opaque glass or frit for producing acid resisting vitreous enamels initially comprising in the raw batch enameling ingredients which when smelted contain in said glass or frit substantially the following constituents: sodium oxide 16.84%; lead oxide 2.97%; calcium fluoride 5.94%; boric anhydride 6.93%; titanium oxide 13.86%; silica 42.57%; zirconia 3.96%; and antimony oxide 6.93%.

CHARLES J. KINZIE.
CHARLES H. COMMONS, Jr.

CERTIFICATE OF CORRECTION.

Patent No. 1,949,479.  March 6, 1934.

CHARLES J. KINZIE, ET AL.

It is hereby certified that the assignee of the above numbered patent was erroneously described and specified as "The Titanium Manufacturing Company," whereas said assignee should have been described and specified as The Titanium Alloy Manufacturing Company, of New York, N. Y., a corporation of Maine, as shown by the records of assignments in this office; and that the said Letters Patent should be read with this correction therein that the same may conform to the record of the case in the Patent Office.

Signed and sealed this 1st day of May, A. D. 1934.

Bryan M. Battey (Seal)  Acting Commissioner of Patents.